US010456849B2

(12) United States Patent
Eminoglu et al.

(10) Patent No.: US 10,456,849 B2
(45) Date of Patent: Oct. 29, 2019

(54) COMPOSITE COMPONENT HAVING ANGLED BRAZE JOINT, COUPON BRAZING METHOD AND RELATED STORAGE MEDIUM

(71) Applicant: General Electric Company, Schenectady, NY (US)

(72) Inventors: Cem Murat Eminoglu, Simpsonville, SC (US); Paul Stephen DiMascio, Greer, SC (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 15/605,294

(22) Filed: May 25, 2017

(65) Prior Publication Data
US 2018/0339354 A1    Nov. 29, 2018

(51) Int. Cl.
*B23K 1/00* (2006.01)
*B23K 1/19* (2006.01)
(Continued)

(52) U.S. Cl.
CPC .......... *B23K 1/0018* (2013.01); *B23K 1/0008* (2013.01); *B23K 1/19* (2013.01);
(Continued)

(58) Field of Classification Search
CPC ...... B23K 1/0008; B23K 1/0018; B23K 1/19; B23K 20/021; B23K 2101/001; B23K 2103/26; B23P 6/005; B23P 13/02; B23P 15/00; F01D 5/005; F01D 25/285; F05D 2230/237; F05D 2250/232
See application file for complete search history.

(56) References Cited

U.S. PATENT DOCUMENTS 3,168,941 A    2/1965    Southard, Jr.
3,763,544 A    10/1973    Gibson, Jr.
(Continued)

FOREIGN PATENT DOCUMENTS

EP    2 586 887 A1    5/2013
EP    2753451 A1    7/2014
(Continued)

OTHER PUBLICATIONS

Extended European Search Report and Opinion issued in connection with corresponding EP Application No. 18173747.9 dated Oct. 15, 2018.
(Continued)

*Primary Examiner* — Yan Lan
(74) *Attorney, Agent, or Firm* — Juergen Hoffmann; Hoffman Warnick LLC (57) ABSTRACT

Various aspects include a composite component (also known as a Shear Enabled Regionally Engineered Facet (SEREF)) and methods of forming such a component. In some cases, a method includes: forming a slot in a main body of a metal alloy component, the slot extending at least partially through a wall of the metal alloy component, the forming of the slot including forming an angled main body interface in the wall of the metal alloy component; forming a coupon for coupling with the slot in the metal alloy component, the coupon having an angled coupon interface complementing the angled main body interface; and brazing the coupon to the main body at the slot to form a composite component.

7 Claims, 7 Drawing Sheets

(51) Int. Cl.
   *B23K 20/02* (2006.01)
   *B23P 6/00* (2006.01)
   *F01D 5/00* (2006.01)
   *B23K 101/00* (2006.01)
   *B23K 103/18* (2006.01)

(52) U.S. Cl.
   CPC ............ *B23K 20/021* (2013.01); *B23P 6/005* (2013.01); *F01D 5/005* (2013.01); *B23K 2101/001* (2018.08); *B23K 2103/26* (2018.08); *F05D 2230/237* (2013.01); *F05D 2250/232* (2013.01)

(56) References Cited

U.S. PATENT DOCUMENTS

| | | | |
|---|---|---|---|
| 4,176,433 A | 12/1979 | Lee et al. | |
| 4,611,744 A | 9/1986 | Fraser et al. | |
| 4,639,997 A | 2/1987 | Brull | |
| 4,830,934 A | 5/1989 | Ferrigno et al. | |
| 5,626,445 A | 5/1997 | Nachbar et al. | |
| 5,735,044 A | 4/1998 | Ferrigno et al. | |
| 5,846,057 A | 12/1998 | Ferrigno et al. | |
| 5,873,703 A | 2/1999 | Kelly et al. | |
| 5,911,680 A | 6/1999 | Takeoka | |
| 6,164,916 A | 12/2000 | Frost et al. | |
| 6,195,864 B1 | 3/2001 | Chesnes | |
| 6,413,650 B1 | 7/2002 | Dupree et al. | |
| 6,454,156 B1 | 9/2002 | Taras, Jr. et al. | |
| 6,998,568 B2 | 2/2006 | Brehm et al. | |
| 7,051,435 B1 | 5/2006 | Subramanian et al. | |
| 7,416,394 B2 | 8/2008 | Ahmad et al. | |
| 7,934,315 B2 | 5/2011 | Milleville | |
| 8,156,649 B2 | 4/2012 | Hövel et al. | |
| 9,174,314 B2 | 11/2015 | Ozbaysal | |
| 9,347,378 B2 | 5/2016 | Cramb et al. | |
| 2003/0034379 A1 | 2/2003 | Jackson et al. | |
| 2005/0120555 A1 | 6/2005 | Boudereau et al. | |
| 2008/0000063 A1 | 1/2008 | Ahmad et al. | |
| 2009/0039062 A1 | 2/2009 | Cretegny et al. | |
| 2009/0229101 A1 | 9/2009 | Ahmad et al. | |
| 2009/0255117 A1 | 10/2009 | Hovel et al. | |
| 2013/0115091 A1 | 5/2013 | Bruck et al. | |
| 2013/0115092 A1 | 5/2013 | Ozbaysal | |
| 2013/0323533 A1 | 12/2013 | Cui et al. | |
| 2014/0348776 A1 | 11/2014 | Palmer, Jr. et al. | |
| 2015/0030460 A1 | 1/2015 | Kottilingam et al. | |
| 2017/0167263 A1 | 6/2017 | Whims et al. | |
| 2018/0126499 A1 | 5/2018 | Eminoglu et al. | |

FOREIGN PATENT DOCUMENTS

| | | |
|---|---|---|
| WO | 9721516 A2 | 8/1997 |
| WO | 2013066671 A1 | 5/2013 |

OTHER PUBLICATIONS

EP Search Report for Application 17461553.4-1610, dated Dec. 11, 2017, 9 pages.

COMPOSITE COMPONENT HAVING ANGLED BRAZE JOINT, COUPON BRAZING METHOD AND RELATED STORAGE MEDIUM

FIELD OF THE INVENTION

The subject matter disclosed herein relates to manufacturing and repair of components. More specifically, the subject matter disclosed herein relates to approaches of manufacturing and/or repairing components using brazing techniques.

BACKGROUND OF THE INVENTION

Metal alloys can be particularly useful in industrial applications. For example, metal alloys are commonly used to form components within industrial machinery subjected to high temperatures, pressures and/or stresses over extended periods. Systems such as turbomachines, dynamoelectric machines, fuel flow systems, aviation systems, etc. employ metal alloys in their parts. During the lifespan of these systems, components may require maintenance and/or repair, which may present particular challenges in the case of metal alloys. For example, brittle metal alloys or high-gamma prime alloys can be structurally compromised when subject to particular types of heat treatment such as welding. This can make repair and maintenance of components formed from these alloys particularly challenging. Additionally, forming composite parts with these types of alloys can be disadvantageous.

BRIEF DESCRIPTION OF THE INVENTION

Various aspects of the disclosure include a composite component and methods of forming such a component. In a first aspect, a method includes: forming a slot in a main body of a metal alloy component, the slot extending at least partially through a wall of the metal alloy component, the forming of the slot including forming an angled main body interface in the wall of the metal alloy component; forming a coupon for coupling with the slot in the metal alloy component, the coupon having an angled coupon interface complementing the angled main body interface; and brazing the coupon to the main body at the slot to form a composite component.

A second aspect of the disclosure includes a composite component having: a metal alloy component including a main body, the main body having: a wall having an inner surface and an outer surface; and a slot extending at least partially through the wall, the slot including an angled main body interface in the wall; a coupon coupled with the slot, the coupon having an angled coupon interface complementing the angled main body interface, wherein the coupon has a larger diameter (LD) spanning the slot across the outer surface of the main body; and a smaller diameter (SD) spanning the slot across an inner surface of the main body, wherein the LD is defined by: $LD=((2*Z)/\tan \alpha)+SD$, wherein $Z=$a thickness of the wall and $\alpha=$an angle of the angled main body interface and the angled coupon interface, as measured from a plane coincident with the outer surface of the main body; and a braze joint coupling the coupon to the main body at the slot.

A third aspect of the disclosure includes a non-transitory computer readable storage medium storing code representative of at least a portion of a composite component, the at least a portion of the composite component physically generated upon execution of the code by a computerized additive manufacturing system, the code including: code representing at least the portion of the composite component, the composite component including: a metal alloy component including a main body, the main body having: a wall having an inner surface and an outer surface; and a slot extending at least partially through the wall, the slot including an angled main body interface in the wall; a coupon coupled with the slot, the coupon having an angled coupon interface complementing the angled main body interface, wherein the coupon has a larger diameter (LD) spanning the slot across the outer surface of the main body; and a smaller diameter (SD) spanning the slot across an inner surface of the main body, wherein the LD is defined by: $LD=((2*Z)/\tan \alpha)+SD$ wherein $Z=$a thickness of the wall and $\alpha=$an angle of the angled main body interface and the angled coupon interface, as measured from a plane coincident with the outer surface of the main body; and a braze joint coupling the coupon to the main body at the slot.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

The subject matter disclosed herein relates to manufacturing and/or repair. More specifically, the subject matter disclosed herein relates to approaches for forming composite components including metal alloys, also known as Shear Enabled Regionally Engineered Facets (SEREF).

In contrast to conventional approaches, various aspects of the disclosure include a composite metal component, and methods of forming such a component. In various embodiments, the composite metal component has a main body and a coupon filling a slot in the main body, and the interface between the main body and the coupon is an angled braze joint. The angled interface between the main body and the coupon, as opposed to a substantially normal interface in conventional composite components, can transfer the tensile stress applied at that interface to predominately shear stress. The composition of metal alloys, in particular, high-gamma prime alloys or other brittle alloys, gives these materials significantly greater shearing strength than tensile strength. As such, these composite components may be stronger than conventional composite components formed with normal braze joints between a main body and a coupon.

In some particular cases, the angle of the interface between the main body and the coupon is approximately 10-25 degrees (measured from surface plane), but could be up to 50 or 60 degrees in some cases. In other embodiments, the angle of the interface between the main body and the coupon is approximately 25-35 degrees, and in other cases it is between approximately 35-45 degrees. In various embodiments, the angle of the interface between the main body and the coupon is defined by an equation which accounts for the surface area of the interface, the angle of the interface, and the thickness of the wall of the main body and the coupon proximate the joint.

In various embodiments, the composite component can include a refurbished component, e.g., where the main body is an original part having gone through field use and the coupon is a replacement portion of the component. In other cases, the composite component can include two original parts (either having gone through field use, or not) joined at an interface, and in other cases, the composite component can include two replacement parts joined at an interface.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Figure 1:
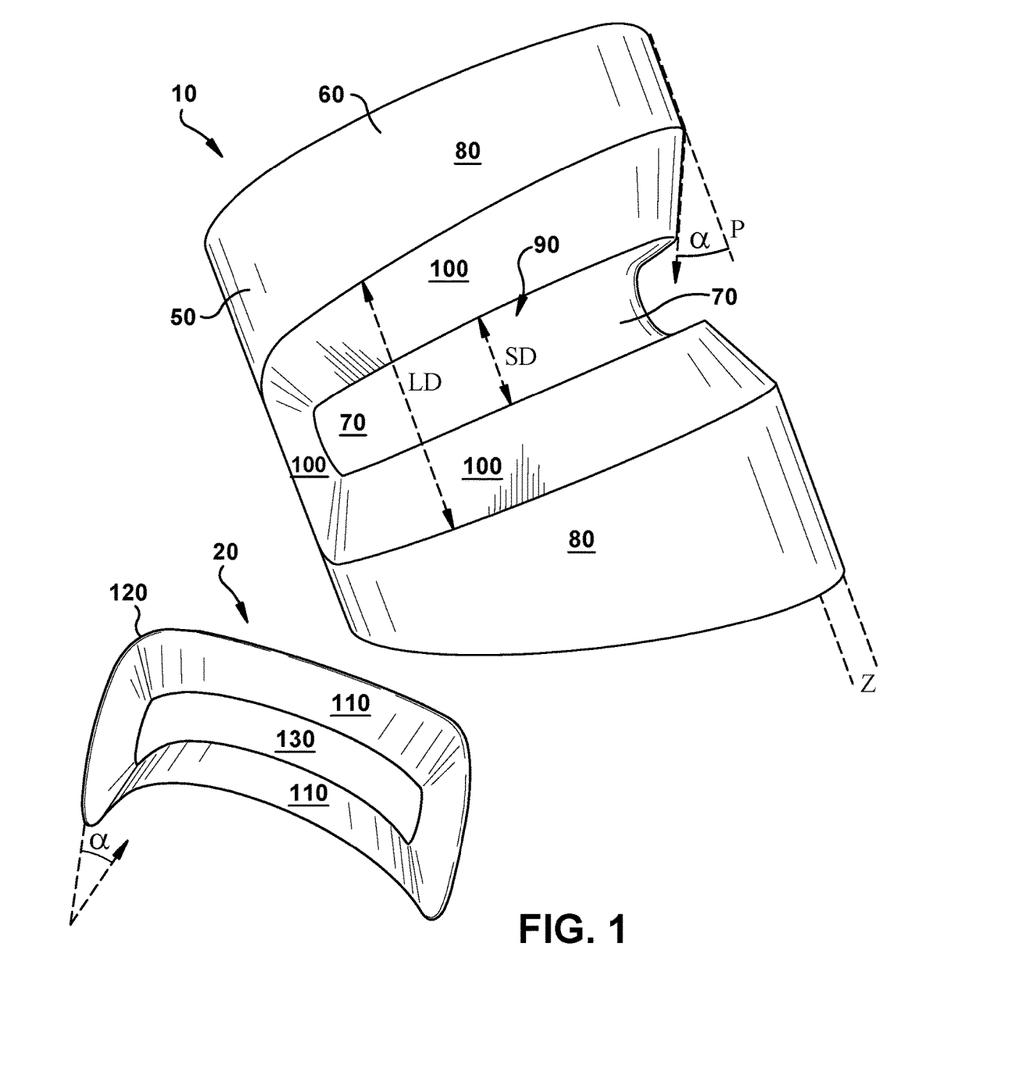
FIG. 1 is a schematic depiction of separated portions of a composite component according to various embodiments of the disclosure.
Figure 2:
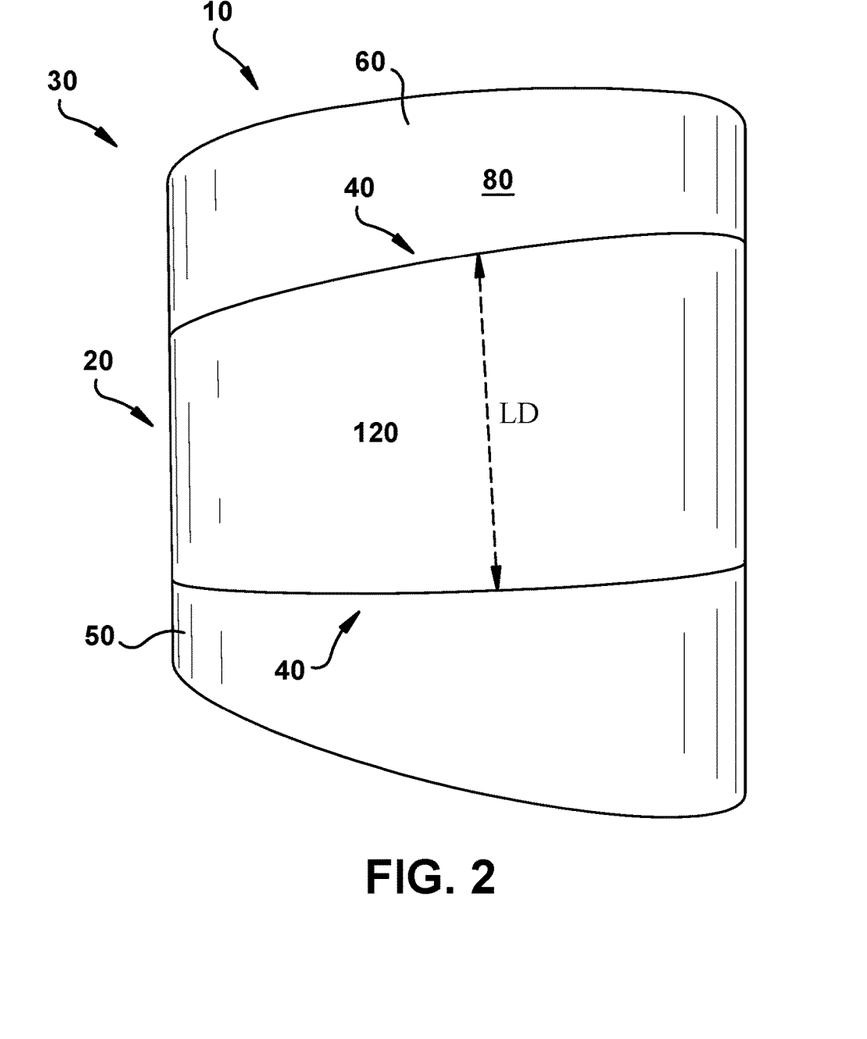
FIG. 2 is a schematic depiction of an assembled composite component according to various embodiments of the disclosure.

FIG. 1 shows a schematic depiction of a metal alloy component 10 and a coupon 20 for coupling with metal alloy component 10. FIG. 2 shows metal alloy component 10 and coupon 20 coupled to form a composite component 30. Also shown in FIG. 2 is a braze joint 40 (portions shown), coupling metal alloy component 10 and coupon 20 at an interface (further described herein). It is understood that braze joint 40 can extend across an entirety of the interface between metal alloy component 10 and coupon 20, or in some cases, may extend only partially across that interface.

With reference to FIGS. 1 and 2, composite component 30 can include metal alloy component 10, which has a main body 50 formed of a metal alloy. In some case, the metal alloy can include a brazeable alloy, such as a high-gamma prime alloy or a brittle alloy. In various embodiments, alloys having a gamma prime percentage greater than 40% can be well suited for approaches according to various embodiments of the disclosure, as these alloys can present challenges in welding. Examples are gamma prime (γ') precipitation-strengthened nickel-base superalloys, particular examples of which can include René 125, René 80, René N5, René N4, René 108, GTD-111™, GTD-444™, Inconel (IN)738, IN792, MAR-M200, MAR-M247, CMSX-3, CMSX-4, PWA1480, PWA1483, and PWA1484. Each of these alloys has a relatively high gamma prime (principally $Ni_3(Al,Ti)$) content as a result of containing significant amounts of aluminum and/or titanium. As noted herein, these metal alloys can be particularly susceptible to structural weakening under particular heat treatments such as welding, and may also be susceptible to failure or undesirable wear under tensile stress. As such, the configuration of composite component 30 may help to transfer tensile stress to shear stress proximate braze joint 40. In some embodiments, coupon 20 includes the same metal alloy as metal alloy component 10, or a distinct metal alloy. In some cases, the coupon 20 can include a metal alloy which is more ductile than the alloy in metal alloy component 10. In various embodiments, coupon 20 can be formed of (single-crystal, or SD) René N5, (directionally solidified, or DS) René 108, and/or (N4) or (Equiaxed, or EA) René 108.

Figure 3:
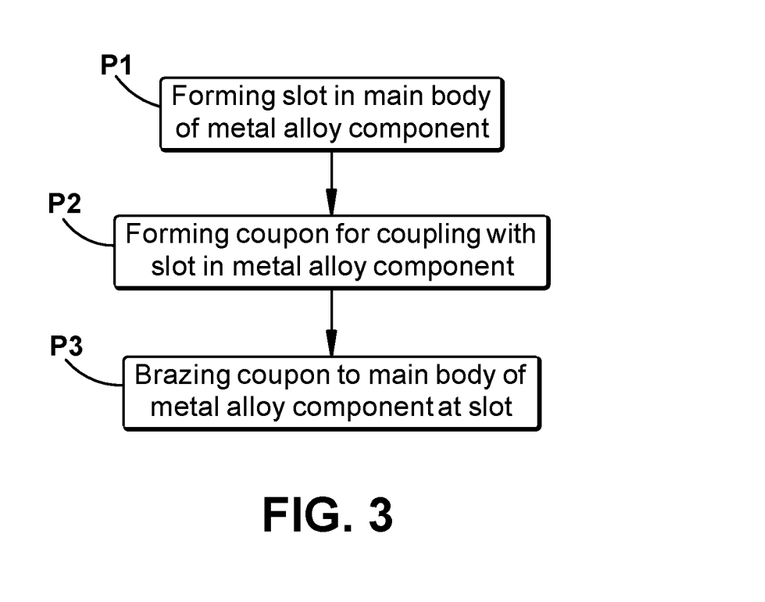
FIG. 3 is a flow diagram illustrating processes in forming a composite component according to various embodiments of the disclosure.

With continuing reference to FIGS. 1-3, main body 50 can have a wall 60 with an inner surface 70 and an (opposed) outer surface 80. In some cases, inner surface 70 and outer surface 80 are merely indicative that these are distinct surfaces proximate braze joint 40 and coupon 20, as the terms "inner" and "outer" are not intended to be limiting. Main body 50 can also include a slot 90 extending at least partially through wall 60 (shown extending entirely through wall 60 in example depiction of FIG. 1). As shown in FIG. 1, slot 90 can include an angled main body interface (face) 100 in wall 60, described further herein.

Composite component 30 can also include coupon 20 coupled with slot 90, where coupon 20 has an angled coupon interface (face) 110 that complements angled main body interface 100. Angled coupon interface (face) 110 can span between an outer surface 120 and an inner surface 130 of coupon 20. In various embodiments, the angle of angled coupon interface 110 is equal or approximately (e.g., within margin of measurement error) equal with the angle of angled main body interface 100, both referred to as angle (α), as measured from a plane (P) coincident with outer surface 80 of main body 50. As shown in FIGS. 1 and 2, coupon 20 can have a taper, such that it has a larger diameter (LD) spanning slot 90 across outer surface 80, and a smaller diameter (SD) spanning slot 90 across inner surface 70. In various embodiments LD is defined by:

$$LD=((2*Z)/\tan \alpha)+SD \qquad \text{(Equation 1)}$$

Wherein Z=a thickness of wall 60. In some cases, angle (α) is between approximately 10 degrees and approximately 60 degrees. However, in other particular embodiments, angle (α) is between approximately 10 degrees and approximately 25 degrees. In other cases, angle (α) is between approximately 25-35 degrees, and in other cases angle (α) is between approximately 35-45 degrees. As noted herein, the angle (α) is designed for these particular metal alloys such that proximate braze joint 40, angled main body interface 100 and angled coupon interface 110 are configured to bear a predominately shear stress in response to application of tension on composite component 30. In some cases, composite component 30 can include a turbomachine component, such as a combustion component or a gas or steam turbine component.

Figure 4:
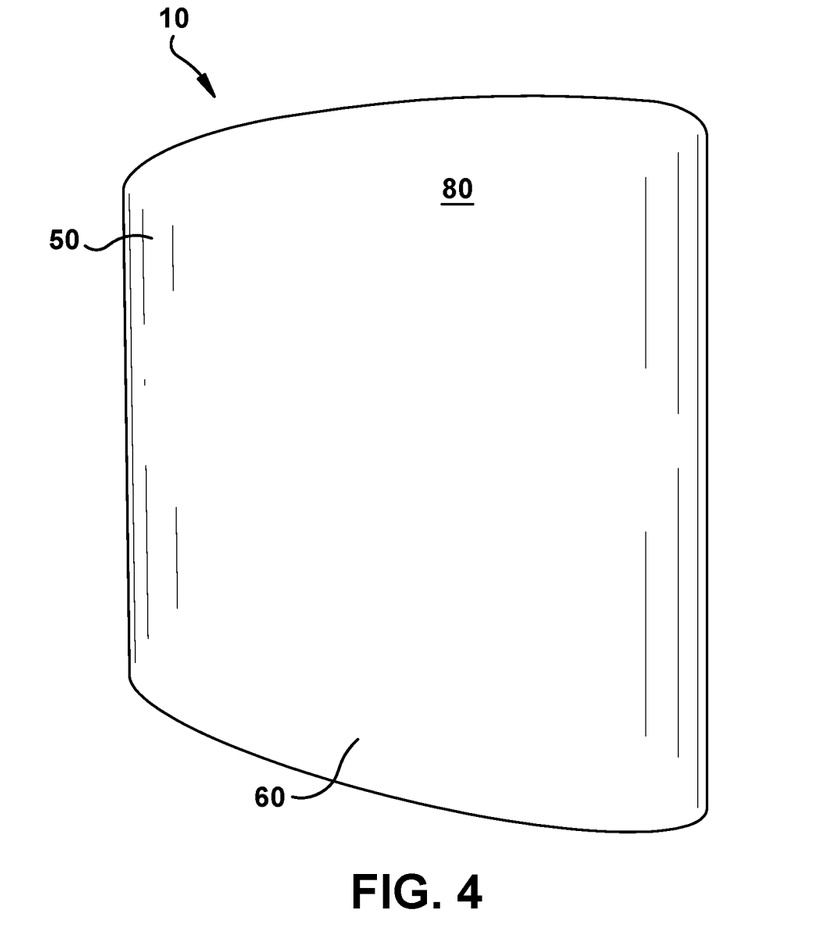
FIG. 4 shows a metal alloy component prior to a process performed according to various embodiments of the disclosure.
Figure 5:
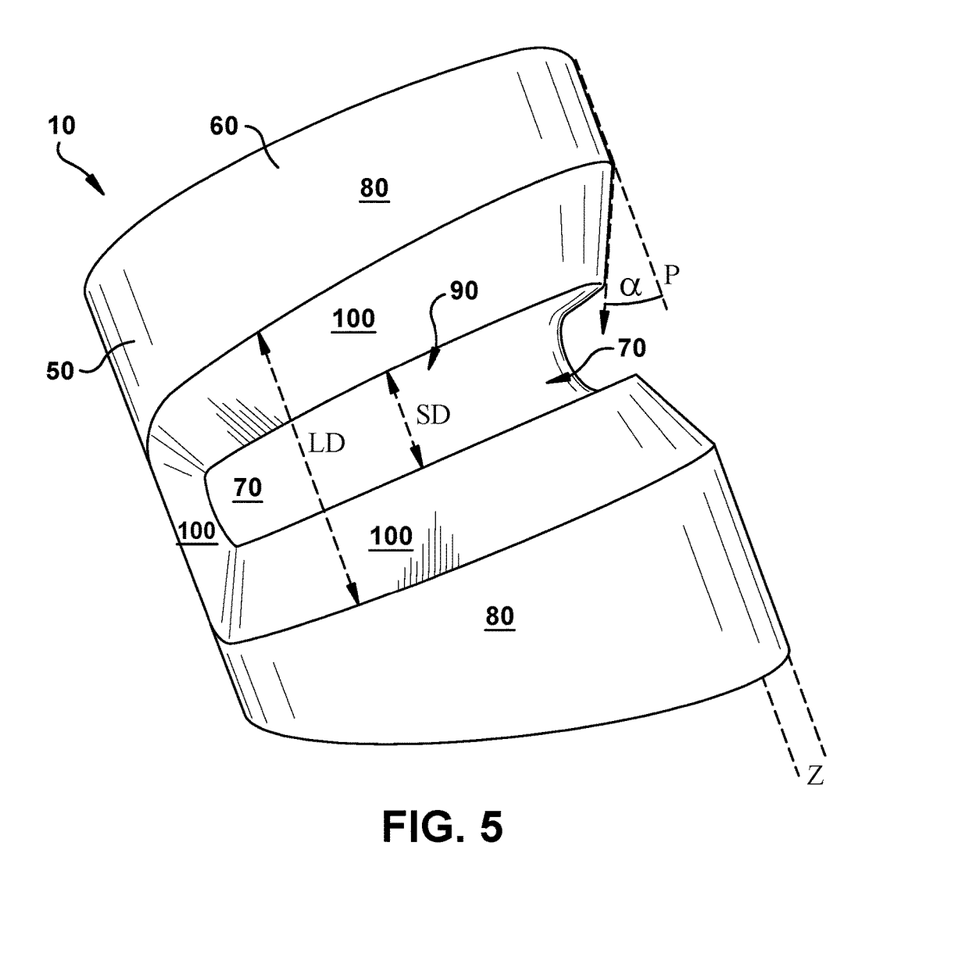
FIG. 5 shows the metal alloy component of FIG. 4 after forming a slot according to various embodiments of the disclosure.

FIG. 3 shows a flow diagram illustrating processes in a method according to various embodiments. FIGS. 4 and 5 illustrate some of the processes described with reference to FIG. 3. In various embodiments, a method can include:

Process P1: forming slot 90 in main body 50 of a metal alloy component 10, where slot 90 is formed to extend at least partially through wall 60 (FIGS. 4 and 5). In various embodiments, forming slot 90 includes forming angled main body interface 100 in wall 60. In various embodiments, metal alloy component 10 can include a previously commissioned component exposed to operation within a machine, e.g., a turbomachine, dynamoelectric machine or other machine. In some cases, metal alloy component 10 includes a turbine bucket, blade or nozzle. It is understood that metal alloy component 10 can include any machine component, in any of a variety of industrial or other machines subjected to high temperatures and/or pressures, e.g., turbomachines, dynamoelectric machines, or engine systems. In other embodiments, metal alloy component 10 can include an original equipment component not yet deployed in operation. In some particular cases, forming slot 90 in main body 50 includes cutting metal alloy component 10, e.g., with a saw or other machining tool. In other cases, metal alloy component 10 can be formed as an original component, including slot 90, via conventional molding, casting, etc., or via additive manufacturing techniques further described herein.

Process P2: forming coupon 20 for coupling with slot 90 in metal alloy component 10, where coupon 20 is formed having angled coupon interface 110 that complements angled main body interface 100 in metal alloy component 10 (coupon 20 shown in FIG. 1). In some cases, coupon 20 is formed by casting or other conventional manufacturing techniques, and in other embodiments, coupon 20 is formed by additive manufacturing techniques further described herein. In various embodiments, coupon 20 includes a metal alloy, e.g., a metal alloy similar to the composition of metal alloy component 10, or a distinct metal alloy. As noted herein, angled main body interface 100 and angled coupon interface 110 can be formed to have angle ($\alpha$) between approximately 10 degrees and approximately 45 degrees, as measured from plane (P) coincident with outer surface 80 of main body 50. It is understood that coupon 20 and slot 90 can be formed to have a range of angles ($\alpha$), larger diameters (LD) and smaller diameters (SD), depending upon the thickness (Z) of wall 60. In various embodiments, diameters (LD, SD) will be dictated in part by a portion of metal alloy component 10 which requires repair. For example, where metal alloy component 10 is in need of repair, a portion of metal alloy component 10 is removed (e.g., cut out), and slot 90 is formed to accommodate coupon 20. In these cases, the dimensions of diameters, along with thickness (Z) of wall 60, will limit the range of interface angles ($\alpha$).

Process P3: after forming coupon 20 and slot 90, this process can include brazing coupon 20 to main body 50 at slot 90 to form composite component 30 (FIG. 2). In various embodiments, conventional brazing techniques can be used to form braze joint 40 along angled main body interface 100 and angled coupon interface 110. In various embodiments the brazing temperature may range between approximately 925 degrees Celsius (C) (approximately 1700 degrees Fahrenheit (F)) and 1260 degrees C. (approximately 2300 degrees F.). In some particular cases, the brazing temperature may range between approximately 1065 degrees C. (approximately 1950 degrees F.) and approximately 1230 degrees F. (approximately 2250 degrees F.). In some cases, the thickness of the braze joint can be between approximately 0.0025 millimeters (mm) (approximately 0.1 mils) and approximately 0.05 inches (approximately 2 mils). In some particular cases, the thickness of the braze joint can be approximately 0.025 millimeters (mm) (approximately 1 mil) to approximately 0.1 mm (approximately 4 mils). As noted herein, the angled main body interface 100 and angled coupon interface 110, proximate (e.g., contacting or nearly contacting braze joint 40) are configured to bear a predominately shear stress in response to application of tension on composite component 30.

In some particular cases, after forming composite component 30, an additional process can include performing a hot isostatic pressure (HIP) heat treatment (HT) on composite component 30. This HIP HT can occur after brazing coupon 20 to main body 50 at slot 90. This HIP HT can include any conventional HIP process known in the art, including the use of an inert gas (e.g., argon) at an elevated temperature (e.g., up to approximately 1,400 degrees C.) and pressure (e.g., up to approximately 300 mega-pascals (MPa)) to reduce the porosity/increase the density of composite component 30.

It is understood that the processes described herein can be performed in any order, and that some processes may be omitted, without departing from the spirit of the disclosure described herein.

While the embodiment of composite component 30 in FIGS. 1 and 2 shows a single coupon 30, it is understood that composite component 30 can include a plurality of coupons 20 which may combine to fill slot 90 according to various embodiments of the disclosure. That is, while a single coupon 20 is shown in FIGS. 1 and 2, it is understood that two or more coupons 20 can be formed in order to fill slot 90 in composite component 30. In some cases, a pair of coupons (e.g., similar to coupon 20) can be coupled with main body 50 at slot 90, e.g., one from each of inner surface 70 and outer surface 80. In these cases, the pair of coupons could share approximately the same shorter diameter (SD) value, their longer diameter (LD) value may be slightly different due to the geometry of composite component 30. These coupons could be coupled with one another, and/or main body 50, with one or more braze joints 40.

Figure 6:
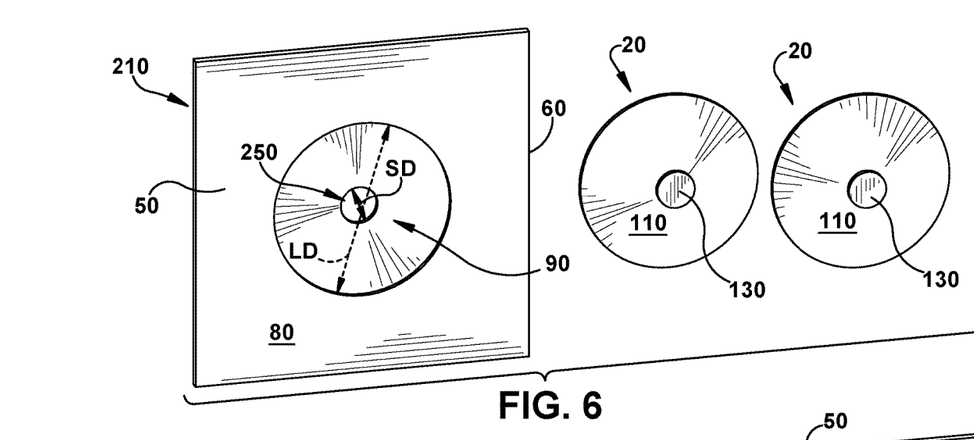
FIG. 6 is a schematic depiction of separated portions of a composite component according to various embodiments of the disclosure.
Figure 7:
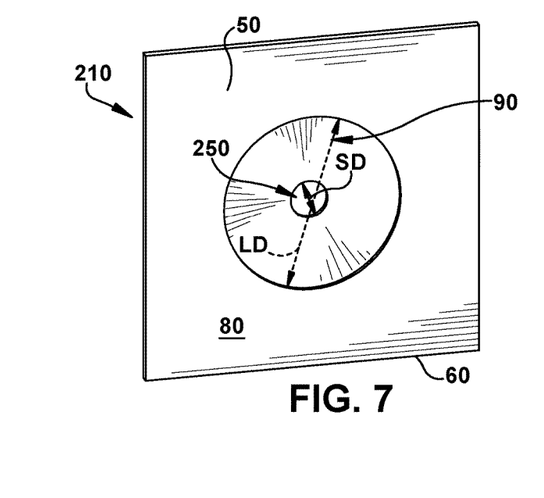
FIG. 7 shows a distinct schematic view of a portion of the composite component of FIG. 6.
Figure 8:
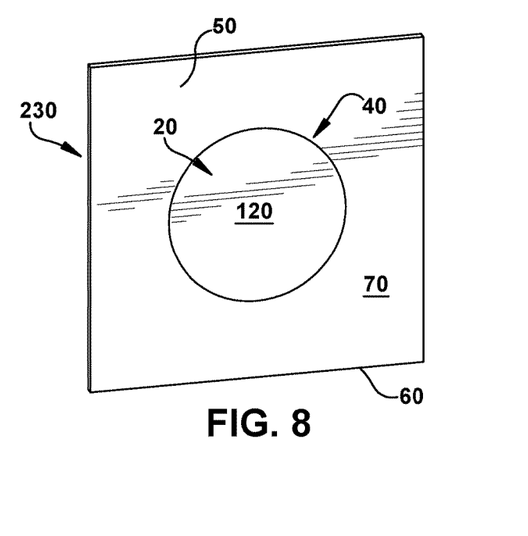
FIG. 8 is a schematic depiction of an assembled composite component according to various embodiments of the disclosure.

In additional embodiments, forming slot 90 in main body 50 can include forming one or more slots 90 from two distinct directions through wall 60. That is, in various embodiments, one or more slots 90 may be formed in main body 50 (as described herein) from one or more surfaces (e.g., inner surface 70, outer surface 80). For example, as shown in the schematic depiction of a metal alloy component 210 in FIGS. 6 and 7, slots 90 can be formed (as described herein) from opposing surfaces (e.g., inner surface 70 and outer surface 80), and a plurality of coupons 20 (FIG. 6) can be formed (as described herein) to couple with slot(s) 90 and form a composite component 230 (FIG. 8). In some cases, two coupons 20 (FIG. 6) are formed to couple with slots 90 on opposing sides (e.g., inner surface 70 and outer surface 80) of metal alloy component 110. Coupons 20 can be coupled with slots 90 as discussed herein to form another embodiment of a composite component. In various embodiments, where two slots 90 are formed from opposing surfaces, those slots 90 may connect to form an aperture 250 through metal alloy component 210, however, in other embodiments, these slots 90 may remain separated by a portion of wall 60. In various embodiments, distinct slots 90 can have distinct dimensions (e.g., as governed by Equation 1), however, in other cases, distinct slots 90 can be substantially symmetrical with respect to wall 60. In these embodiments, e.g., with two distinct slots 90 through opposite surfaces 70, 80 of wall 60, the larger diameter (LD) can be reduced relative to the larger diameter (LD) in composite component 30, which permits composite component 230 to have a lesser interface angle (α) (relative to composite component 30), while still being configured to bear a predominately shear stress in response to application of tension on composite component 230.

One or more portions of composite component 30 (FIG. 2) and/or composite component 230 (FIG. 8) may be formed in a number of ways. In one embodiment, as noted herein, at least a portion of composite component 30 may be formed by conventional manufacturing techniques, such as molding, casting, machining (e.g., cutting), etc. In one embodiment, however, additive manufacturing is particularly suited for manufacturing at least a portion of composite component 30 (FIG. 2) and/or composite component 230 (FIG. 8), e.g., metal alloy component 10, metal alloy component 210 and/or coupon 20. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal (e.g., alloy) or other material such as plastics and/or polymers, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM can be beneficial.

Figure 9:
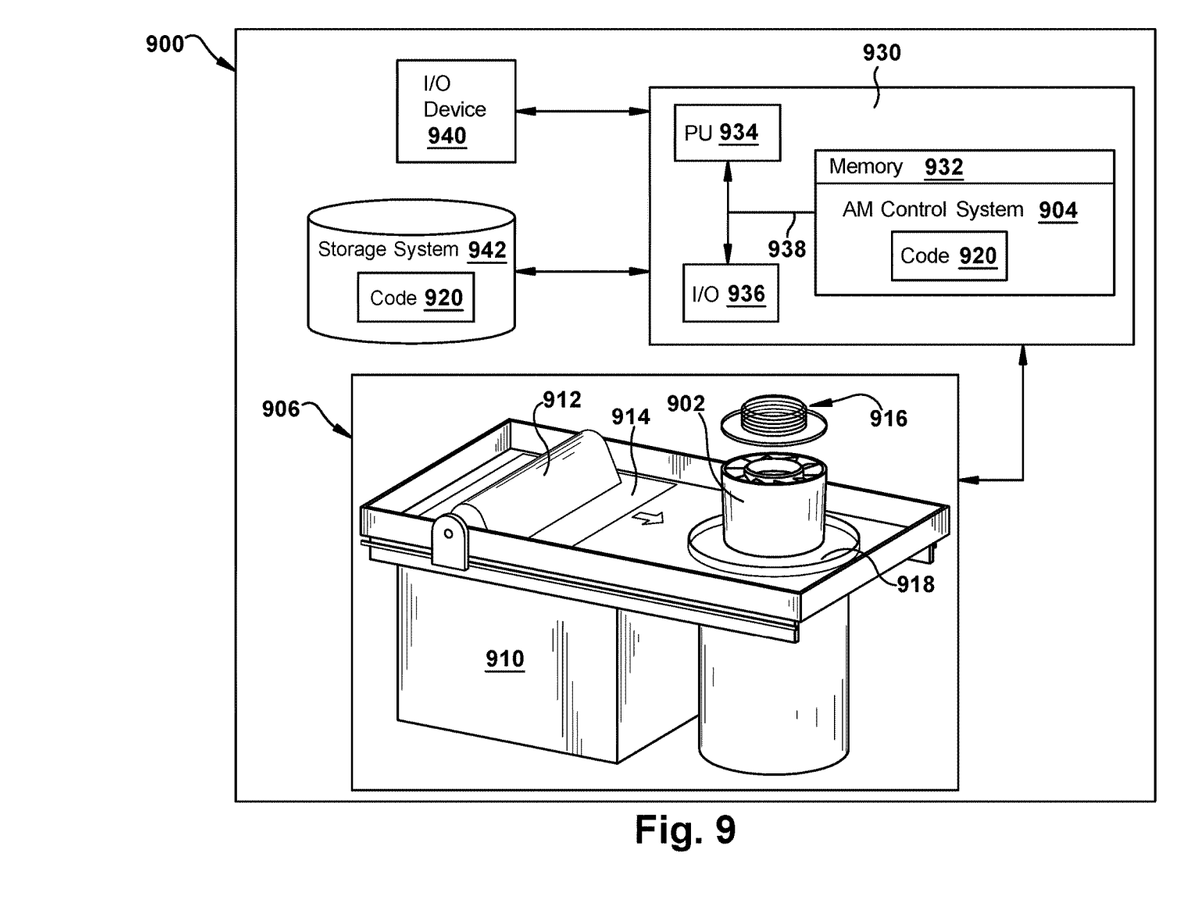
FIG. 9 shows a block diagram of an additive manufacturing process including a non-transitory computer readable storage medium storing code representative of one or more portions of the composite component of FIG. 2 according to embodiments of the disclosure.

To illustrate an example of an additive manufacturing process, FIG. 9 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture at least a portion of composite component 30 (FIG. 2) and/or composite component 230 (FIG. 8), e.g., metal alloy component 10, metal alloy component 110 and/or coupon 20. AM system 900 generally includes a computerized additive manufacturing (AM) control system 904 and an AM printer 906. AM system 900, as will be described, executes code 920 that includes a set of computer-executable instructions defining at least a portion of composite component 30 (FIG. 2) and/or composite component 230 (FIG. 8) to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, at least a portion of composite component 30 (FIG. 2) and/or composite component 230 (FIG. 8) may be made of metal(s), alloy(s), plastic/polymers or similar materials. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of at least a portion of composite component 30 (FIG. 2) and/or composite component 230 (FIG. 8), described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of at least a portion of composite component 30 (FIG. 2) and/or composite component 230 (FIG. 8). As noted, code 920 includes a set of computer-executable instructions defining outer electrode that can be used to physically generate the tip, upon execution of the code by system 900. For example, code 920 may include a precisely defined 3D model of outer electrode and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing at least a portion of composite component 30 (FIG. 2) and/or composite component 230 (FIG. 8) into a series of thin slices that it assembles using AM printer 906 in successive layers of liquid, powder, sheet or other material. In the DMLM example, each layer is melted to the exact geometry defined by code 920 and fused to the preceding layer. Subsequently, the portion(s) of composite component 30 (FIG. 2) and/or composite component 230 (FIG. 8) may be exposed to any variety of finishing processes, e.g., minor machining, sealing, polishing, assembly to other part of the igniter tip, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A composite component comprising:
    a metal alloy component including a main body, the main body having:
        a wall having an inner surface and an outer surface; and
        a slot extending at least partially through the wall, the slot including an angled main body interface in the wall;
    a coupon coupled with the slot, the coupon having an angled coupon interface complementing the angled main body interface, wherein the coupon has a larger diameter (LD) spanning the slot across the outer surface of the main body; and a smaller diameter (SD) spanning the slot across an inner surface of the main body, wherein the LD is defined by:

$LD=((2*Z)/\tan \alpha)+SD$ wherein $Z$=a thickness of the wall and $\alpha$=an angle of the angled main body interface and the angled coupon interface, as measured from a plane coincident with the outer surface of the main body; and
    a braze joint coupling the coupon to the main body at the slot.

2. The composite component of claim 1, wherein the metal alloy component includes a high-gamma prime alloy or a brittle alloy including: René 125, René 80, René N5, René N4, René 108, GTD-111, GTD-444, Inconel (IN) 738, IN792, MAR-M200, MAR-M247, CMSX-3, CMSX-4, PWA1480, PWA1483, or PWA1484.

3. The composite component of claim 1, wherein the angle $\alpha$ is between approximately 10 degrees and approximately 45 degrees, as measured from the plane coincident with the outer surface of the main body.

4. The composite component of claim 1, wherein the angle $\alpha$ is between approximately 10 degrees and approximately 25 degrees, as measured from the plane coincident with the outer surface of the main body.

5. The composite component of claim 1, wherein the angled main body interface and the angled coupon interface are configured to bear a predominately shear stress in response to application of tension on the composite component.

6. The composite component of claim 1, wherein the composite component includes a turbomachine component.

7. The composite component of claim 1, wherein the coupon includes the metal alloy or a distinct metal alloy from the metal alloy of the metal alloy component.

* * * * *